(12) United States Patent
Kobayashi

(10) Patent No.: US 7,005,771 B2
(45) Date of Patent: Feb. 28, 2006

(54) VARIABLE RELUCTANCE RESOLVER

(75) Inventor: Masahiro Kobayashi, Tokyo (JP)

(73) Assignee: Minebea Co., Ltd., (JP)

( * ) Notice: Subject to any disclaimer, the term of this patent is extended or adjusted under 35 U.S.C. 154(b) by 218 days.

(21) Appl. No.: 10/631,924

(22) Filed: Jul. 31, 2003

(65) Prior Publication Data

US 2004/0070389 A1   Apr. 15, 2004

(30) Foreign Application Priority Data

Aug. 2, 2002   (JP)   ............. 2002-226302

(51) Int. Cl.
*H02M 5/00*   (2006.01)
(52) U.S. Cl. ............... 310/168; 324/207.25; 318/661
(58) Field of Classification Search ............ 310/162, 310/168–170; 318/605, 661; 340/870.31; 324/207.16, 207.19, 207.25; 33/1 PT
See application file for complete search history.

(56) References Cited

U.S. PATENT DOCUMENTS

| | | | |
|---|---|---|---|
| 3,041,486 A | | 6/1962 | Moffitt |
| 3,085,192 A | * | 4/1963 | Maier ......................... 323/348 |
| 4,631,510 A | * | 12/1986 | Nagarkatti et al. ......... 336/135 |
| 4,672,347 A | * | 6/1987 | Garcia et al. ............... 336/132 |
| 4,733,117 A | * | 3/1988 | Perrins ....................... 310/162 |
| 5,250,889 A | * | 10/1993 | Ezuka ......................... 318/661 |
| 5,300,884 A | * | 4/1994 | Maestre ................. 324/207.25 |
| 5,446,966 A | * | 9/1995 | Ishizaki ...................... 33/1 PT |
| 5,757,182 A | * | 5/1998 | Kitazawa ............... 324/207.17 |
| 6,137,204 A | * | 10/2000 | Kuwahara ................... 310/254 |
| 6,472,841 B1 | * | 10/2002 | Piedl et al. ................. 318/661 |

FOREIGN PATENT DOCUMENTS

| | | | |
|---|---|---|---|
| EP | 0 294 929 A2 | | 4/1988 |
| EP | 0 585 725 A1 | | 8/1993 |
| EP | 877464 A2 | * | 11/1998 |
| GB | 769038 | | 2/1957 |
| JP | 10-239010 A | * | 9/1998 |
| JP | 10-288537 A | * | 10/1998 |
| JP | 2001-191931 | * | 7/2001 |
| JP | 2002-054949 A | * | 2/2002 |

OTHER PUBLICATIONS

European Search Report dated Jan. 3, 2005.

* cited by examiner

*Primary Examiner*—Burton Mullins
(74) *Attorney, Agent, or Firm*—Schulte Roth & Zabel, LLP; Joel E. Lutzker; Anna Vishev

(57) ABSTRACT

A variable reluctance resolver is provided with an output winding having a reduced effect from externally introduced leakage magnetic flux. A variable reluctance resolver is provided with a resolver excitation winding and a resolver output winding wrapped around multiple stator magnetic poles which respectively output rotary angle X and Y components as a rotor turns. Windings are wound such that the polarities of output voltages on output windings wound around a row of three or more stator magnetic poles will be the same; all of the output windings are divided into an even number, two or greater, of groups, and output windings are serially connected in such a way that adjacent group output voltage polarities mutually differ. Also, the number of turns inside the aforementioned groups is wound so that the number of turns of output windings positioned on each of the adjacent group sides is smaller than the number of turns of the output windings positioned on the inside of the aforementioned output windings in the relevant group.

14 Claims, 13 Drawing Sheets

| Axis Multiple Angle N | No. of Excitation Pole Pairs P | No. of Output Pole Pairs Q | No. of Slots S | Cancellation Possible? Y/N |
|---|---|---|---|---|
| 7 | 6 | 1 | 12k | × |
| 7 | 5 | 2 | 10k | ○ |
| 7 | 4 | 3 | 8k | × |
| 7 | 9 | 2 | 18k | ○ |
| 7 | 10 | 3 | 20k | × |
| 7 | 11 | 4 | 22k | ○ |
| 7 | 12 | 5 | 24k | × |
| 7 | 13 | 6 | 26k | ○ |
| 7 | 14 | 7 | 28k | ○ | k: integer

| Axis Multiple Angle N | No. of Excitation Pole Pairs P | No. of Output Pole Pairs Q | No. of Slots S | Cancellation Possible? Y/N |
|---|---|---|---|---|
| 7 | 6 | 1 | 12k | × |
| 7 | 5 | 2 | 10k | ○ |
| 7 | 4 | 3 | 8k | × |
| 7 | 9 | 2 | 18k | ○ |
| 7 | 10 | 3 | 20k | × |
| 7 | 11 | 4 | 22k | ○ |
| 7 | 12 | 5 | 24k | × |
| 7 | 13 | 6 | 26k | ○ |
| 7 | 14 | 7 | 28k | ○ | k: integer

Fig. 5

| Stator Magnetic Pole No. | Coil No. of Turns |
|---|---|
| 1 | -72 |
| 2 | -189 |
| 3 | -234 |
| 4 | -189 |
| 5 | -72 |
| 6 | 72 |
| 7 | 189 |
| 8 | 234 |
| 9 | 189 |
| 10 | 72 |
| 11 | -72 |
| 12 | -189 |
| 13 | -234 |
| 14 | -189 |
| 15 | -72 |
| 16 | 72 |
| 17 | 189 |
| 18 | 234 |
| 19 | 189 |
| 20 | 72 |

| Stator Magnetic Pole No. | Coil No. of Turns |
|---|---|
| 1 | -39 |
| 2 | -39 |
| 3 | 39 |
| 4 | 39 |
| 5 | -39 |
| 6 | -39 |
| 7 | 39 |
| 8 | 39 |
| 9 | -39 |
| 10 | -39 |
| 11 | 39 |
| 12 | 39 |
| 13 | -39 |
| 14 | -39 |
| 15 | 39 |
| 16 | 39 |
| 17 | -39 |
| 18 | -39 |
| 19 | 39 |
| 20 | 39 |

VARIABLE RELUCTANCE RESOLVER

CROSS-REFERENCE TO RELATED APPLICATIONS

This application claims priority from Japanese Patent Application No. 2002-226302 filed on Aug. 2, 2002.

FIELD OF THE INVENTION

The present invention relates to a variable reluctance resolver, and in particular to a variable reluctance resolver in which the effect of external magnetism on output voltage is small.

BACKGROUND OF THE INVENTION

A resolver is one type of a detection device for detecting the rotary position of a rotating machine such as a motor or a generator. Resolvers are widely used as rotary position detection devices for rotary machinery used under poor conditions, due to their ability to be used in harsher environments than encoders equipped with Hall elements or phototransistors. Resolvers of this type are typically disposed in positions adjacent to exciter coils such as motors or generators arrayed within a case. For that reason, electromagnetic noise generated by the excitation current which flows to the excitation coils in motors or generators can sometimes be superimposed onto the resolver stator excitation coils or output coils so that an accurate rotary position cannot be detected.

One type of resolver is a variable reluctance resolver structured such that excitation coils and output coils are wound not on the rotor, but on the same multiple magnetic poles of the resolver stator, and multiple stator magnetic pole output coils are serially connected to obtain a single output coil output. Such variable reluctance resolvers, as shown in FIG. 10, are provided with multiple stator magnetic poles 51 on the stator 5, multiple teeth 55 on the rotor 52, excitation coil 53, output coil 54X which outputs the rotor X directional component, and the output coil 54Y which outputs the rotor Y axis component are wound on the same pole of the relevant stator magnetic poles 51.

As shown in FIG. 11, the variable reluctance resolver is used, for example, with the output coil 54X, which outputs the X directional component of the rotor 52, and the output coil 54Y, which outputs the Y directional component of the rotor 52, connected to a resolver digital circuit 30, which produces a digital output corresponding to the resolver rotational angle. In said variable reluctance resolver, the relationship between the axis multiple angle N (the cycle count for the output voltage obtained in one revolution of the rotor 52), the area P (excitation pole pairs), the area Q (output pole pairs), and the slot (output magnetic pole) number S is expressed as shown below. In Expression 1, the amount± is appropriately determined in accordance with the multiple angle N.

$N=(P\pm Q)$  (Expression 1)

$S=2*m*P$  (Expression 2)

(m is an integer)

In order to facilitate an understanding of the invention, an explanation is given below for a conventional variable reluctance resolver using FIG. 11. For the output of the output coil 54X, which outputs the rotor's X directional component when the direction of magnetization produced by the voltage induced at the output coil 54X by the excitation coil 53 has the same direction of magnetization as the excitation coil 53, the voltage ENS induced on a selected one of the poles is as shown in Expression 3, where the A.C. voltage VP applied to the excitation coil 53 is $E \sin \omega t$. Here $\omega$ is the angular frequency, expressed as $2\pi$. f is a frequency, and "a" and "b" are constants determined by the excitation coil 53, the output coil 54X, and the characteristics of the rotor and the stator.

$ENS=(a+b \sin \theta) \times E \sin \omega t$  (Expression 3)

When the direction of magnetization created by the voltage induced in the output coil 54X by the excitation coil 53 differs in direction from the excitation coil 53 magnetization, the voltage ENN induced on a selected single pole is expressed by Expression 4.

$ENN=(-a+b \sin \theta) \times E \sin \omega t$  (Expression 4)

The relationship between the excitation coil 53 wound on a freely selected pole and the output coil 54X is as shown below. That is to say, the excitation coil 53 is wound in such a way that magnetic poles N and S occur alternately, one pole at a time, and the output coil 54X is wound in such a way that the N pole and S pole occur as a bipole combination. In other words, when a first pole excitation coil 53 is an N pole, the first and second poles of the output coil 54X will be N poles, and the third and fourth poles will be S poles, which will be thereafter repeated. The same is true of the output coil 54Y.

When the first and second poles of an output coil wound in this structure are serially connected, the voltage generated by poles 1 and 2, V12, changes from Expressions 3 and 4 to Expression 5.

$V12=(a+b \sin \theta) \times E \sin \omega t+(-a+b \sin \theta) \times E \sin \omega t$  (Expression 5)

Similarly, the voltage V34 in Expression 6 is generated by poles 3 and 4.

$V34=-(a+b \sin \theta) \times E \sin \omega t-(-a+b \sin \theta) \times E \sin \omega t$  (Expression 6)

Summarizing Expressions 5 and 6, the constant "a" term is canceled when adjacent poles are serially connected, and the voltages V12 and V34 as shown in Expression 7 are obtained.

$V12=2b \sin \theta \times E \sin \omega t=-V34$  (Expression 7)

Therefore in the case of a multiple of 2 poles, the constant "a" cancels when all pole output coils are serially connected, and the output coil 54X output voltage VS is given by Expression 8. Here, KK is a constant determined by the constant "b" ("B") and the number of poles; with a number of poles NN. This is shown in Expression 9.

$VS=KK \sin \theta \times E \sin \omega t$  (Expression 8)

$KK=NN \times B$  (Expression 9)

Therefore, as shown in Expression 10, an output is obtained which corresponds to the change in the rotor rotational angle $\theta$.

$VS=NN \times B \times \sin \theta \times E \sin \omega t$  (Expression 10)

Similarly, an output voltage for the output coil 54Y is obtained, each output is applied to the resolver digital circuit 30, and an angle is measured.

As described above, the variable reluctance resolver obtained by winding an excitation coil and an output coil around the same pole of the stator, and connecting the output coils of multiple poles serially as the output of one output coil is used in both motors and generators, etc. When a magnetic field is applied from outside the resolver, there are frequent cases in which a magnetic flux caused by the external magnetic field mixes in with the aforementioned stator of the variable reluctance resolver. The external magnetic flux induces a voltage on each of the variable reluctance resolver stator coils; each of these is respectively added, generating an induced voltage on the output coil, affecting the output VS shown in Expression 10 and degrading the accuracy of the variable reluctance resolver.

Below is explained the effect of the external magnetic flux on the variable reluctance resolver output coil using FIGS. 12 through 14. In the variable reluctance resolver shown in FIG. 12, the excitation voltage causes a voltage of same polarity S to be induced on the output coil (not shown) wound on stator magnetic poles 510 through 515 (referred to as the G1 output coil); another output coil (not shown) is wound on stator magnetic poles 516 through 521 (referred to as the G2 output coil) in order to induce a voltage having the same polarity N, different from the previous polarity S. Next, explained is the case in which an external magnetic flux φ is introduced from the axial X0 direction to the stator 5 within the variable reluctance resolver. The axis Y0 is the axis perpendicular to the axis X0.

As shown in FIG. 12, a voltage of the same polarity S is induced on the G1 output coil by the excitation voltage, and each output coil is wound in such a way that the same polarity N, different from the previous polarity S, is induced on the G2 output coil. When an external magnetic flux φ is mixed in from the axial X0 direction, the directions of the external magnetic flux φ operating on the left and right sides of the axis Y0 (the G1 output coil and G2 output coil) are mutually opposing directions. For G2, an external magnetic flux φ mixes in from the outer side of the stator 5; for G1 an external magnetic flux φ mixes in on the inside of the stator 5, which is to say the tip of each stator magnetic pole. As a result, the G2 output coil is wound in such a way as to have the opposite polarity to the G1 output coil polarity, but the voltage induced on the G1 and G2 output coils have the same polarity (N) and N, which are respectively added and output. In other words, all of the output wires are affected by external magnetic fluxes.

The effect of external magnetic flux on the output coil in a variable reluctance resolver having an output coil with a number of fixed magnetic pole teeth different from FIG. 12, in which, as in FIG. 13, the axial multiple angle is 5 and the number of fixed magnetic poles is 20, is as shown below. In the variable reluctance resolver of FIG. 13, an output coil (not shown) is wound in such a way that a same polarity S voltage is induced on the output coil (called the group A output coil) wound around a pair of 2 adjacent stator magnetic poles (for example stator magnetic poles 611 and 612) and a voltage of polarity N different from the group A output coil polarity S is induced on the output coil (called the group B output coil) wound around a group of 2 stator magnetic poles adjacent to group A. As shown below, the group A output coil and group B output coil are alternately wound, with 2 adjacent stator magnetic poles forming one group.

The effect imparted on an output coil by the external magnetic flux φ when an external magnetic flux φ is mixed into the stator 5 from the axis X0 direction (the horizontal direction between the stator magnetic poles 624, 625) in the variable reluctance resolver is now explained in connection with FIG. 13. Axis Y0 is perpendicular to the axis X0. As shown in FIG. 13, a same polarity S voltage is induced in each of the group A output coils by the excitation voltage applied to the excitation coil, and a voltage of same polarity N, different from the polarity S, is induced in each of the group B output coils. However, when the external magnetic flux φ is introduced from the axis X0 direction, the external magnetic flux φ directions on the left and right side of the axis Y0 are mutually opposing directions (on the left side of the axis Y0, the external magnetic flux φ mixes in from the outside of the stator 5, and on the right side of the axis Y0, the external magnetic flux φ mixes in from the inside of the stator 5, which is to say from the tip of each stator magnetic pole).

Therefore, the output coils are wound in such a way that the voltages induced in each output coil by the voltages applied to the excitation coil have the same polarity for each Group A output coil, and have the same polarity for each output coil in Group B within the applicable group, but for the induced voltage with respect to the external magnetic flux φ the direction of external magnetic flux with respect to the output coil is different between the left and right sides of the axis Y0. In other words, the polarity of the induced voltage in the output coil wound on the right side of the axis Y0 reverses and becomes the opposite polarity (shown respectively by the letters (S) and (N)). As a result, the induced voltages generated by the external magnetic flux φ cancel one another out between the adjacent output coils on the same side as axis Y0, or between the output coils positioned to mutually face the axis X0 (for example, between the output coils 629 and 620 as indicated by the dotted line K).

Meanwhile, the case when the external magnetic flux φ is introduced into the stator 5 from an angle and axis X0 direction (the horizontal direction between the stator magnetic poles 625, 626) that is different from the angle shown in FIG. 13 is shown in FIG. 14. That is, the induced voltage generated by the external magnetic flux φ is not canceled between the adjacent output coils on the same side as axis Y0, or between the output coils positioned to mutually face the X0 axis, whereas the voltage induced between the group A output coils (for example, between output coils 628 and 629) do mutually cancel one another. However, the external magnetic flux φ and the stator magnetic pole angle differ in said mutually canceling output coils (for example, between output coils 628 and 629), and therefore the proportion of external magnetic flux φ mixing differs. As a result, the induced voltage remains within each group without being canceled.

The winding is such that the voltages produced by excitation voltages applied to excitation coils have respectively opposite N and S polarities in output coils 610, 621 and output coils 611, 620, but the directions of the external magnetic flux φ which works on output coils 610, 621 and output coils 611, 620 are respectively reversed, since the external magnetic flux φ direction is reversed. As a result, the output coils 610, 621 and 611, 620 have the opposite polarities N, S, but the voltages excited in both coils respectively each take on the same polarity N (N); each is respectively added together, and the output coils 610, 611, 620, 621 (the output coils outlined by reference numeral K1) directly receive the effect of the external magnetic flux.

In other words, as shown in FIG. 13, voltages of the same polarity S are induced on a selected group of output coils, taking 2 adjacent stator magnetic poles as one group, and in the variable reluctance resolver, in which output coils are alternately wound in such a way that voltage[s] of the same polarity N, different from said polarity S, are induced in the output coils in another group adjacent to said selected group, the degree of effect therefrom is different according to the direction from which the external magnetic flux φ mixes.

Various magnetic shields for magnetic shield placement on various parts are disclosed in order to resolve the negative effects arising from external magnetic fields received by said resolver. For example, there is the invention disclosed in Laid Open Patent Publication 2001-191931, in which the motor stator and the resolver stator are affixed within the same housing, and a hollow, disk-shaped magnetic shield part is disposed between said motor stator and said resolver stator.

However, said magnetic shield requires a shield part with low magnetic resistance. Such shield materials are expensive, and shielding the variable reluctance resolver causes the device to increase in size. Furthermore, it is necessary to know the direction of the external magnetic flux and to place the magnetic shield where it will be effective, but there are many cases in which it is difficult to determine said effective position. At the same time, if a magnetic shield is not provided, the effect of external magnetic flux will be received by all the output coils in output coils such as shown in FIG. 12, and, in output coils such as shown in FIG. 13, and problems will arise such as different output coils receiving the effect due to the direction in which the external magnetic flux mixes.

SUMMARY OF THE INVENTION

An object of the present invention is to resolve problems in the prior art resolvers by providing a variable reluctance resolver equipped with an output coil with reduced susceptibility to the effects of external magnetic flux.

Another object of the present invention is to provide a variable reluctance resolver that eliminates the effects of external magnet flux by having output coils wound such that the polarities of output voltages on the output coils wound around 3 or more stator magnetic poles are the same and all of the output coils are divided into an even number of groups.

Accordingly, a variable reluctance resolver is provided having multiple stator magnetic poles having resolver exciter coils and resolver output coils, which respectively output the X component and Y component of a rotary angle in accordance with the rotation of a rotor, wherein the resolver output coils are wound such that the output voltage polarities of output coils wound around at least 3 adjacent stator magnetic poles are the same, all the resolver output coils are divided into at least 2 or a greater even number of groups, and resolver output coils within each of the at least 2 or a greater even number of groups are connected in series such that output voltage polarities of adjacent groups differ with respect to one another.

In a further aspect, each group has outermost output coils and output coils between the outermost output coils and the number of turns of each of the outermost output coils is less than the number of turns of the output coils in between to thereby reduce the effect of external magnetic flux.

In a further aspect, the variable reluctance resolver has an axis multiple angle of 7, an excitation pole pair count of 5, an output pole pair count of 2, and a stator magnetic pole count of 20, wherein all output coils are divided into 4 groups, one group includes output coils wound around 5 adjacent stator magnetic poles such that the polarity of output voltages in the group is the same, and the output coils in each of the four groups are serially connected so that the output voltage polarities of adjacent groups are different.

Further features and advantages of the present invention will become evident to one skilled in the art upon reading of the detailed description of the invention, which is given below by way of example only and with reference to the accompanying drawings, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 5 is a table showing the relationship between the axis multiple angle, the number of excitation pole pairs, the number of output pole pairs, and the number of slots in a variable reluctance resolver according to an embodiment of the present invention;

DETAILED DESCRIPTION

Figure 1:
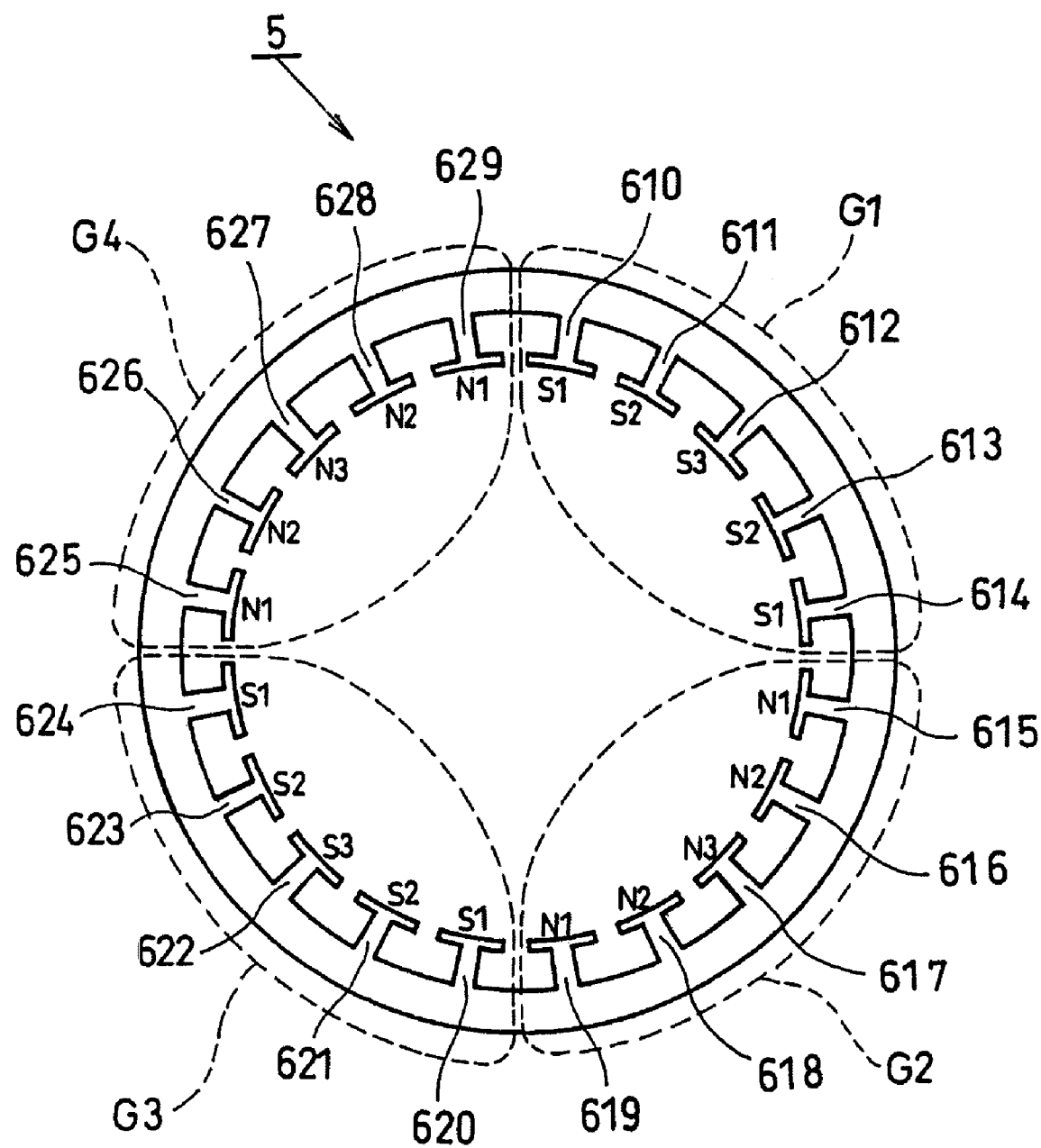
FIG. 1 is a diagram depicting the polarity of output coils in the variable reluctance resolver of an embodiment of the present invention.
Figure 13:
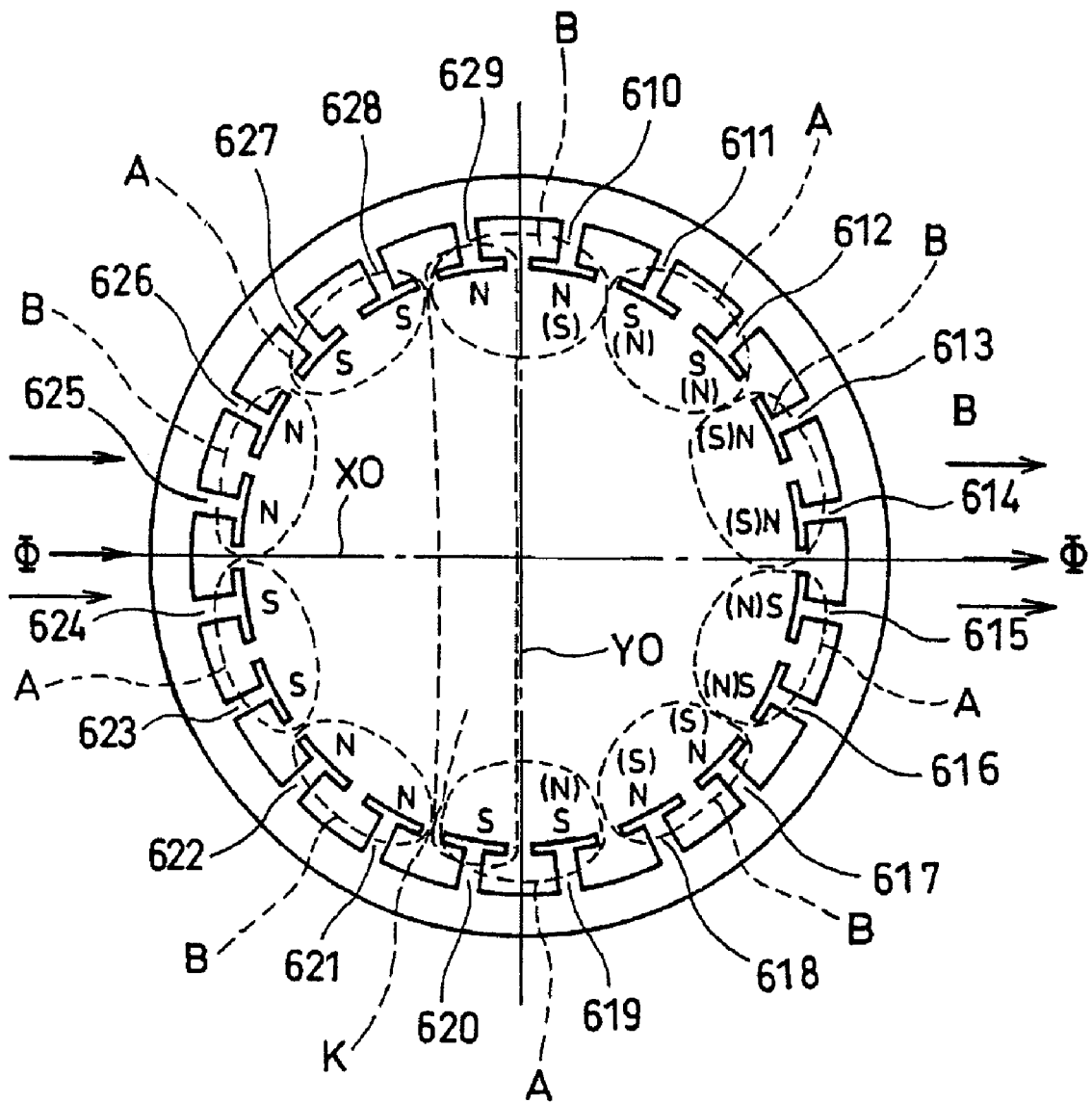
FIG. 13 is a diagram depicting the effect of external magnetic flux on output coils wound around stator magnetic poles different in number from that shown in FIG. 12, formed on a conventional variable reluctance resolver stator.
Figure 14:
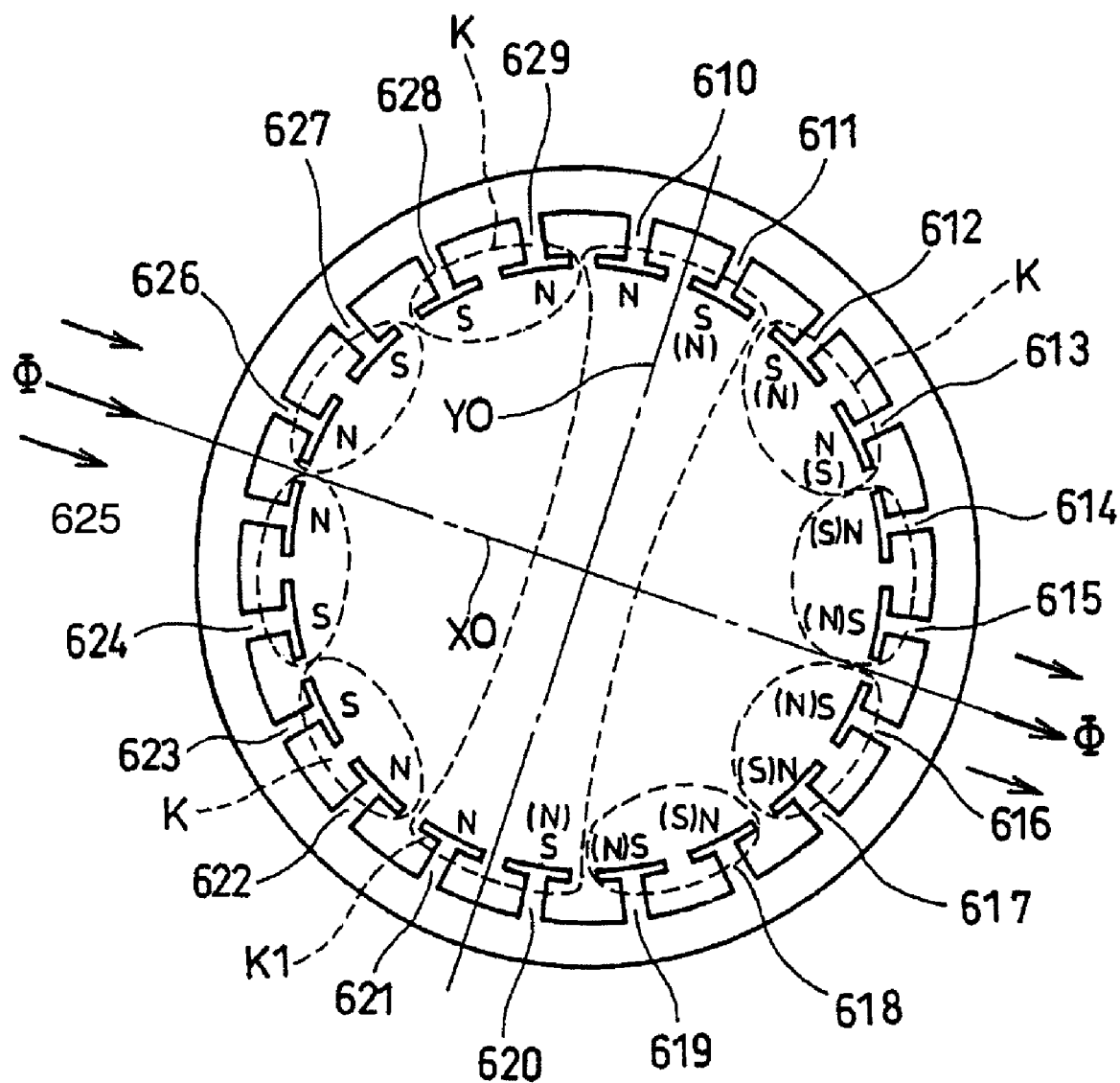
FIG. 14 is a diagram depicting the effect of external magnetic flux on output coils when the angles of external magnetic flux introduction differ.

For ease of understanding, the variable reluctance resolver shown in FIG. 1 of a preferred embodiment is described, in which the axial multiple angle is 7, the number of excitation pole pairs is 5, the number of output pole pairs is 2, and the number of stator magnetic poles is 20. Like the stator shown in FIG. 13, the stator 5 in FIG. 1, has 20 stator magnetic poles 610 through 629 formed on the stator 5, but the configuration of the output coils wound around the stator magnetic poles differs as follows. First, explained is the polarity of the output coils.

In FIG. 1, the stator magnetic poles 610 through 614, 615 through 619, 620 through 624, and 625 through 629 are respectively divided into 4 groups: Group 1 (G1), Group 2 (G2), Group 3 (G3), and Group 4 (G4). In each of these groups, winding is done such that within G1, G2, G3, and G4 he polarity of the output voltages of each said output coil (not shown) will be the same due to the excitation voltage, and each is respectively serially connected. Also, the output voltages of the output coils respectively serially connected within G1 and G3 will output a same polarity S voltage due to the excitation voltage. Similarly, the output voltages of the output coils respectively serially connected within G2 and G4 will output a voltage of polarity N opposite to said G1 and G3 due to the excitation voltage.

As described above, there are respectively 5 stator magnetic poles within each of the groups (G1, G2, G3, G4), and the number of turns of the output coils positioned on the outsides of each of the adjacent said groups is smaller than the number of turns of the output coils positioned to the inside of said outside stator magnetic poles. For example, in the group G1, the number of turns of the output coils wound around the outside stator magnetic poles 610 and 614 positioned adjacent groups G4 and G2, respectively, is fewer than the number of turns of the output coils wound on the stator magnetic poles 611 and 613 positioned to the inside of said stator magnetic poles 610 and 614. Similarly, the number of turns of the output coils wound around the stator magnetic poles 611 and 613 adjacent G4 and G2 is smaller than the number of turns of the output coils wound around the stator magnetic pole 612 positioned to the inside of said stator magnetic poles 611 and 613. The same is true below with respect to G2, G3, and G4. By thus making the number of turns of the output coil positioned on each adjacent said group smaller than the number of turns of the output coil positioned to the inside of said stator magnetic pole within the relevant group, the output voltage shown in Expression 10 due to the excitation voltage becomes smooth, and the accuracy of the variable reluctance resolver is improved.

Figure 2:
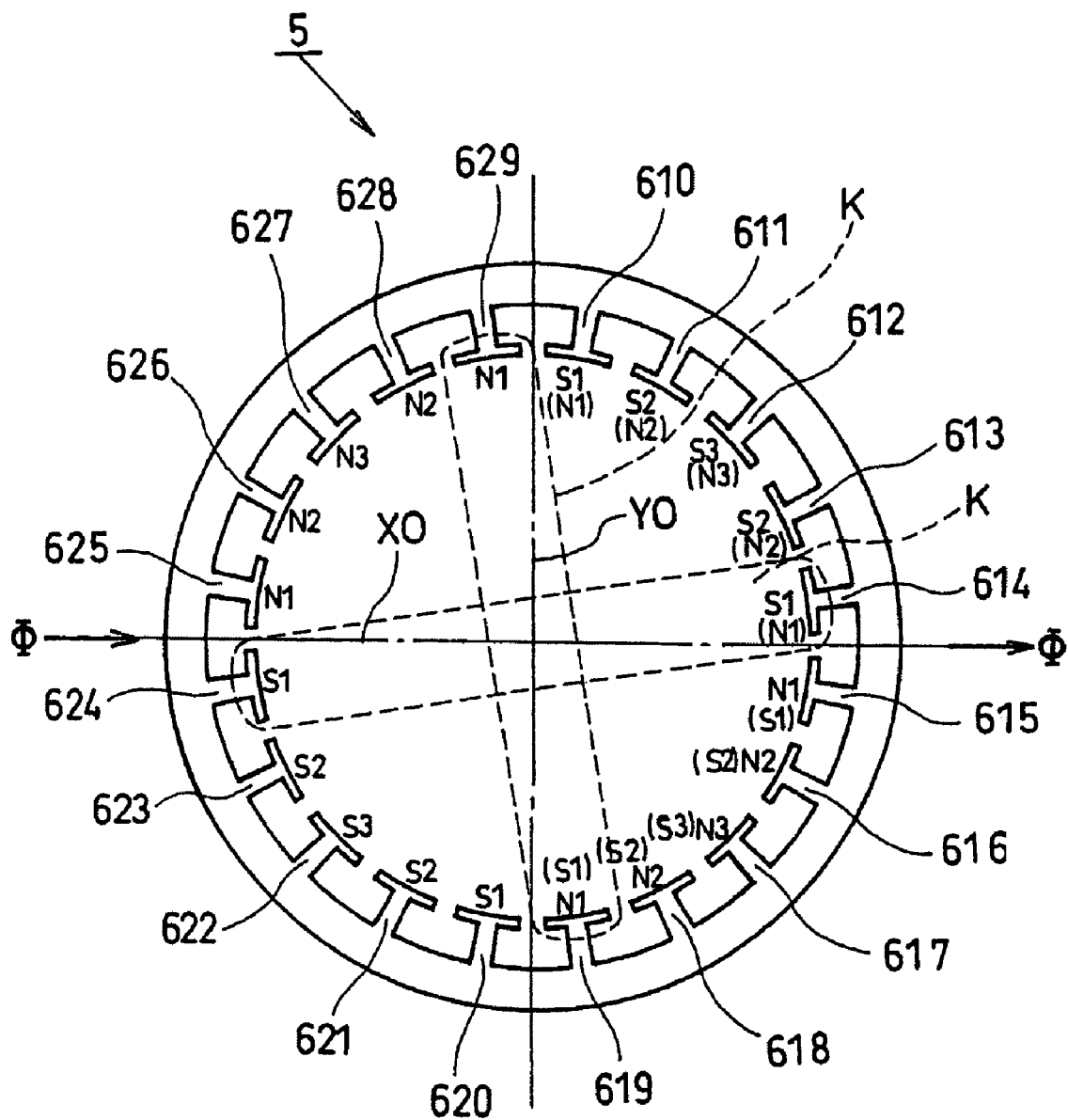
FIG. 2 is a diagram depicting the effects of external magnetic flux on the variable reluctance resolver output coils in an embodiment of the present invention.

The effect of external magnetic flux $\phi$ on the output coils of the variable reluctance resolver wound as described above is explained using FIGS. 2 through 4. FIG. 2 explains the case in which external magnetic flux $\phi$ from outside the variable reluctance resolver stator 5 is mixed into stator 5 from the axis X0 direction (the horizontal direction between stator magnetic poles 624, 625). Axis Y0 is perpendicular to axis X0.

As shown in FIG. 2, voltages of the same polarity S are induced in the G1 and G3 output coils by the excitation voltage applied to the excitation coils, and a polarity N voltage different from said polarity S is induced on the G2 and G4 output coils, so the induced voltage from the external magnetic flux $\phi$ works similarly. In other words, in G4 and G3 the external magnetic flux $\phi$ mixes in from outside of stator 5, and in G1 and G2 the external magnetic flux $\phi$ mixes in from the inside of stator 5, which is to say the tip of each stator magnetic pole. The output coils are wound in such a way that voltages induced in each output coil have the same polarity S for each G1 and G3 output coil, and have a polarity N (opposite to the polarity S of G1 and G3) for each of the output coils in G2 and G4, but there is a difference between the left and right sides with respect to the external magnetic flux $\phi$. That is to say, the polarity of the output coil wound on the right side of axis Y0 reverses and takes the opposite polarity (shown by the letters (S), (N) respectively). As a result, the voltages induced in the G1 and G3 output coils and the G2 and G4 output coils are mutually canceled between the output coils positioned so as to be mutually facing with respect to the center of the stator 5.

Figure 3:
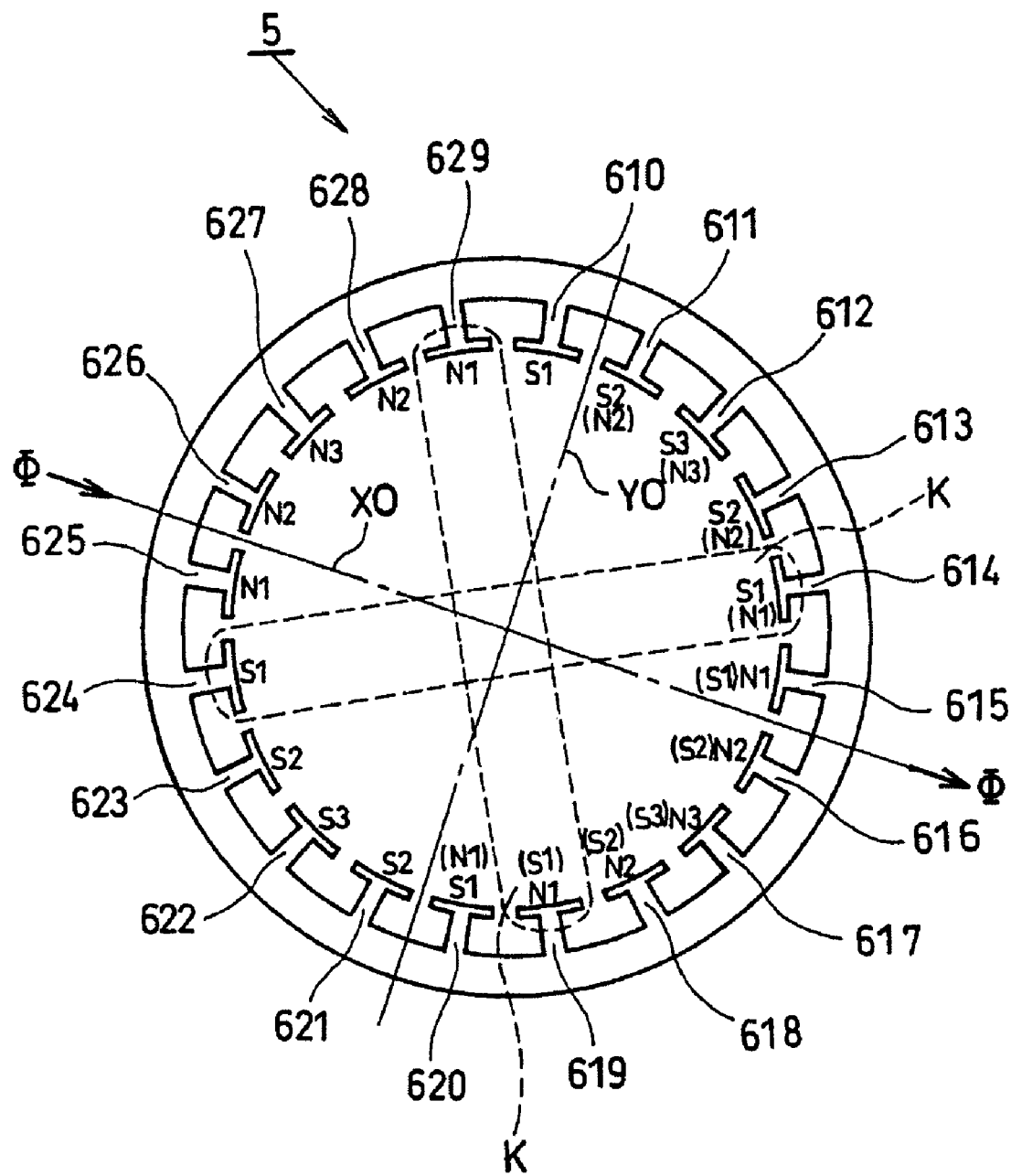
FIG. 3 is a diagram depicting the effect of external magnetic flux on the output coils when the angle at which external magnetic flux is introduced differs from the angle shown in FIG. 2.

In FIG. 3, an example in which an external magnetic flux $\phi$ is mixed into the stator 5 from a different direction to FIG. 2 (the horizontal direction between stator magnetic poles 625, 626) is shown. That is, using axis Y0 as a dividing line, the direction in which the external magnetic flux $\phi$ works on the output coil to the left and right is the opposite direction. Therefore the voltage induced in the output coil by the external magnetic flux $\phi$ reverses on the right side, taking axis Y0 as a dividing line (respectively shown by the legends (S), (N)). As a result, the voltages induced in the output coil cancel one another between the output coils positioned so as to mutually face one another centered on the stator 5 (for example, the output coils wound around the stator magnetic poles 629 and 619 shown by the letter K). Similarly, the voltages induced between the output coils wound around the stator magnetic poles 614 and 624 also cancel one another out. The same is true for other output coils. In other words, even if an external magnetic flux $\phi$ mixes in from a given angle, there is always an output coil in which the induced voltage is canceled.

Figure 4:
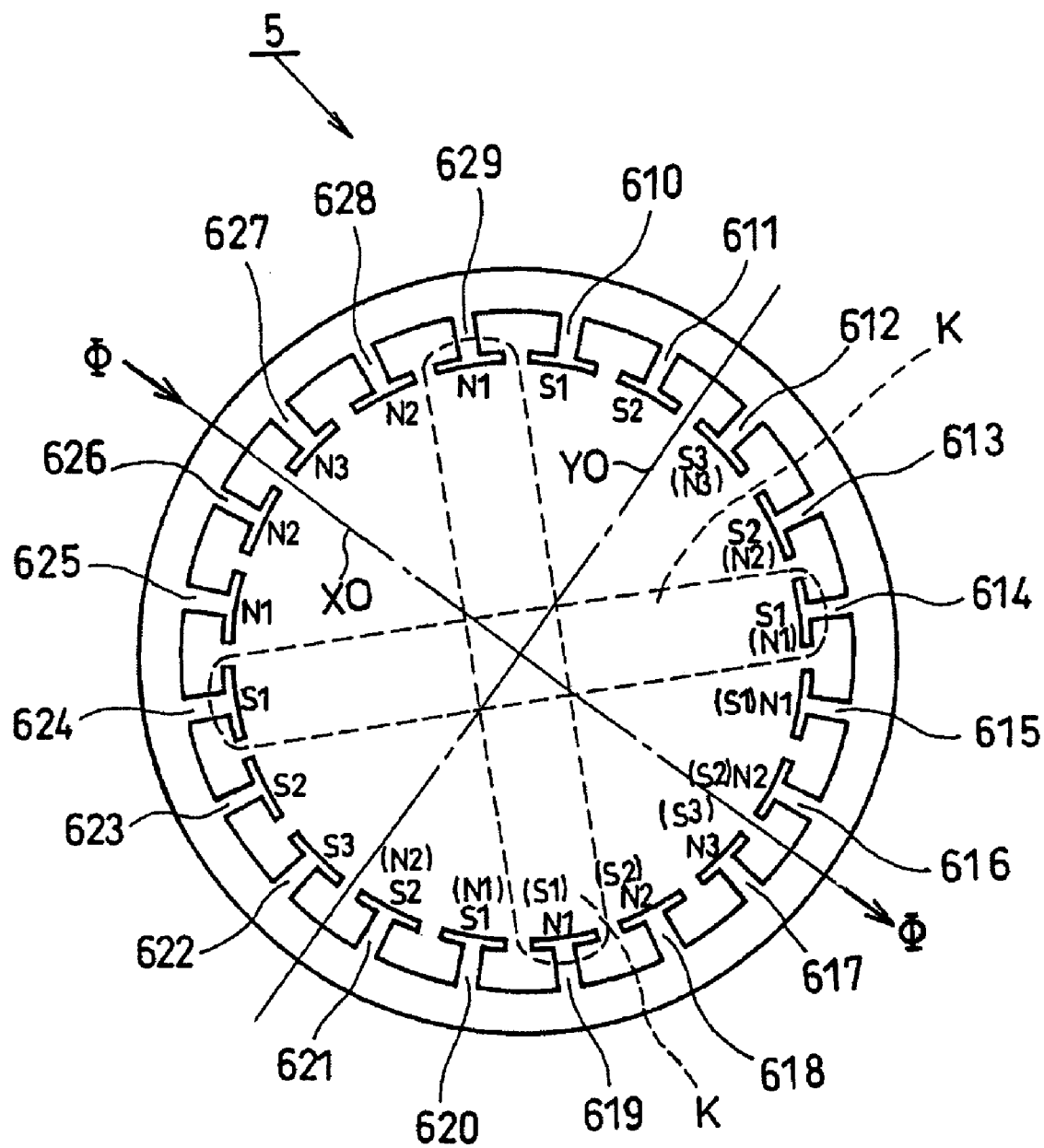
FIG. 4 is a diagram depicting the effect of external magnetic flux on the output coils when the angle at which external magnetic flux is introduced differs from the angle shown in FIG. 3.

In FIG. 4, an example in which an external magnetic flux $\phi$ is mixed into the stator 5 from an angle or direction differing from FIGS. 2 and 3 (the horizontal direction between stator magnetic poles 626, 627) is shown. That is, taking axis Y0 as a dividing line, the direction of the external magnetic flux $\phi$ which works on the output coils on the left and right side thereof is the opposite direction. Regarding voltages induced in the output coils, while the G1 and G3 output coils have the same polarity S, and the G2 and G4 output coils have a different polarity N, the output coil polarity on the right side of axis Y0, similar to what is described above, has the opposite polarity due to the external magnetic flux $\phi$ (respectively shown by letters (S), (N)). As a result, voltages induced by the external magnetic flux $\phi$ cancel one another in the output coils positioned in mutual opposition with respect to the center of stator 5 (for example, between the output coils wound around the stator magnetic poles 629 and 619, or between the output coils wound around the stator magnetic poles 614 and 625, indicated by the letter K). In other words, even if an external magnetic flux $\phi$ mixes in from the relevant angle, in one of the output coils there is always an output coil in which the induced voltage is canceled.

As is shown in FIG. 1, due to the winding of the output coils there is always an output coil in which induced voltages are canceled, no matter from which direction the external magnetic flux is introduced, so that even if the external magnetic flux $\phi$ and the stator magnetic pole angles differ in said mutually canceling output coils, the induced voltages will mutually cancel due to the output coils (having the same number of turns) positioned symmetrically with respect to the stator 5 center. As a result, even if the angle at which the external magnetic flux $\phi$ mixes in differs due to the stator magnetic pole, or the proportion of external magnetic flux $\phi$ differs according to output coil due to differences in magnetic circuit magnetic resistance, or the variable reluctance resolver is provided with output coils having numbers of turns different from above, the induced voltages will be canceled.

FIG. 5 explains the case in which, the output coils are wound around a row of 3 or more stator magnetic poles so that the output voltages have the same polarity, all the output coils are divided into 2 or more groups, and output coils are respectively serially connected so that the aforesaid adjacent group output voltages polarities mutually differ, with (O) showing the case where induced voltages are canceled, and (X) the case where they are not. In other words, it explains the necessity of division into 2 or a greater even number of groups.

Using the relationship between axis multiple angle N, the number of excitation pole pairs P, the number of output pole pairs Q, and the number of slots (output magnetic poles) S shown in Expressions 1 and 2, the case in which axis multiple angle N=7 is explained. Using Expressions 1 and 2, P, Q, and S are determined such that 7=(P±Q). However, said ± amount is appropriately determined by the axis multiple angle N. When the number of output pole pairs Q is an even number, there are always output coils that mutually cancel, and therefore the induced voltages are canceled (shown by "O"). However, when the number of output pole pairs Q is odd, there are cases in which, depending on the angle at which the external magnetic flux φ mixes, there are no output coils that mutually cancel, and the induced voltage will continuously not be canceled (shown by the "X"). For example, in the case of N=7, P=4, Q=3, and S=8k, which is to say the case in which the number of output pole pairs Q is odd, the fact that the induced voltage is not canceled is explained using FIG. 6.

Figure 6:
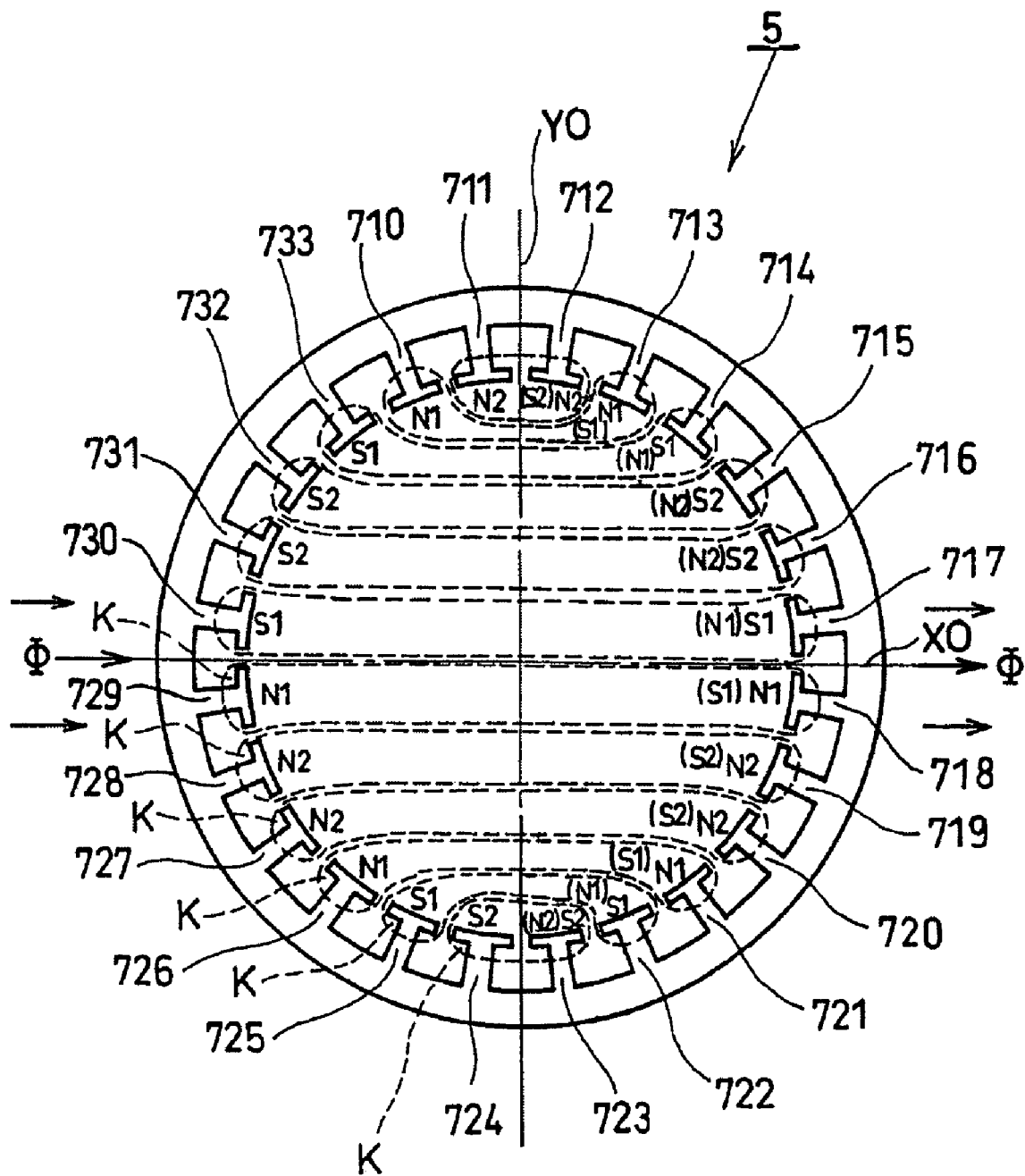
FIG. 6 is a diagram depicting the necessity for having two (2) or a greater even number of groups according to an embodiment of the present invention.

In FIG. 6, rows of four stator magnetic poles 710 through 713, 714 through 717, 718 through 721, 722 through 725, 726 through 729, and 730 through 733 are respectively divided into 6 groups, Group 1 (G1), Group 2 (G2), Group 3 (G3), Group 4 (G4), Group 5 (G5), and Group 6 (G6) so as to satisfy Expressions 1 and 2. In each of the aforesaid groups, each output coil not shown is wound such that in groups G1, G2, G3, G4, G5, and G6 the polarity of the output voltage in each output coil due to the excitation voltage applied to the excitation coil will be the same, and each is respectively serially connected. Also, the output voltage of the output coils respectively serially connected in each of the aforementioned G1, G3, and G5 will output a same N polarity voltage. Similarly, the output voltages of the output coils respectively serially connected in each of G2, G4, and G6 have the same polarity, and output an S polarity voltage opposite to the aforementioned G1, G3, and G5.

FIG. 6 explains the case in which an external magnetic flux φ is introduced from outside the variable reluctance resolver stator 5 to the stator 5 from the axis X0 direction (the horizontal direction between the stator magnetic poles 729, 730). Axis Y0 is perpendicular to axis X0. As shown in FIG. 6, the winding is such that voltages of the same polarity N are induced in the G1, G3, and G5 output coils by the excitation voltage, and voltages of polarity S, different from the aforementioned N polarity, are induced in the G2, G4 and G6 output coils. However, an external magnetic flux φ is introduced from outside the stator 5 to the left side of axis Y0, and an external magnetic flux φ is introduced from the inside of the stator 5, which is to say the tip of each stator magnetic pole, to the right side of axis Y0. As a result, the voltage induced on each output coil differs between the left and right sides of the axis Y0 with respect to the external magnetic flux φ. In other words, the polarity of the output coil wound around the right side of the axis inverts due to the external magnetic flux φ and acts so as to generate an induced voltage of opposite polarity (shown respectively by (S) and (N)). As a result, the aforementioned induced voltages cancel one another between the output coils positioned so as to mutually oppose one another at left and right with respect to the axis Y0 (for example, the output coils wound around the stator magnetic poles 728 and 719 shown by letter K).

Figure 7:
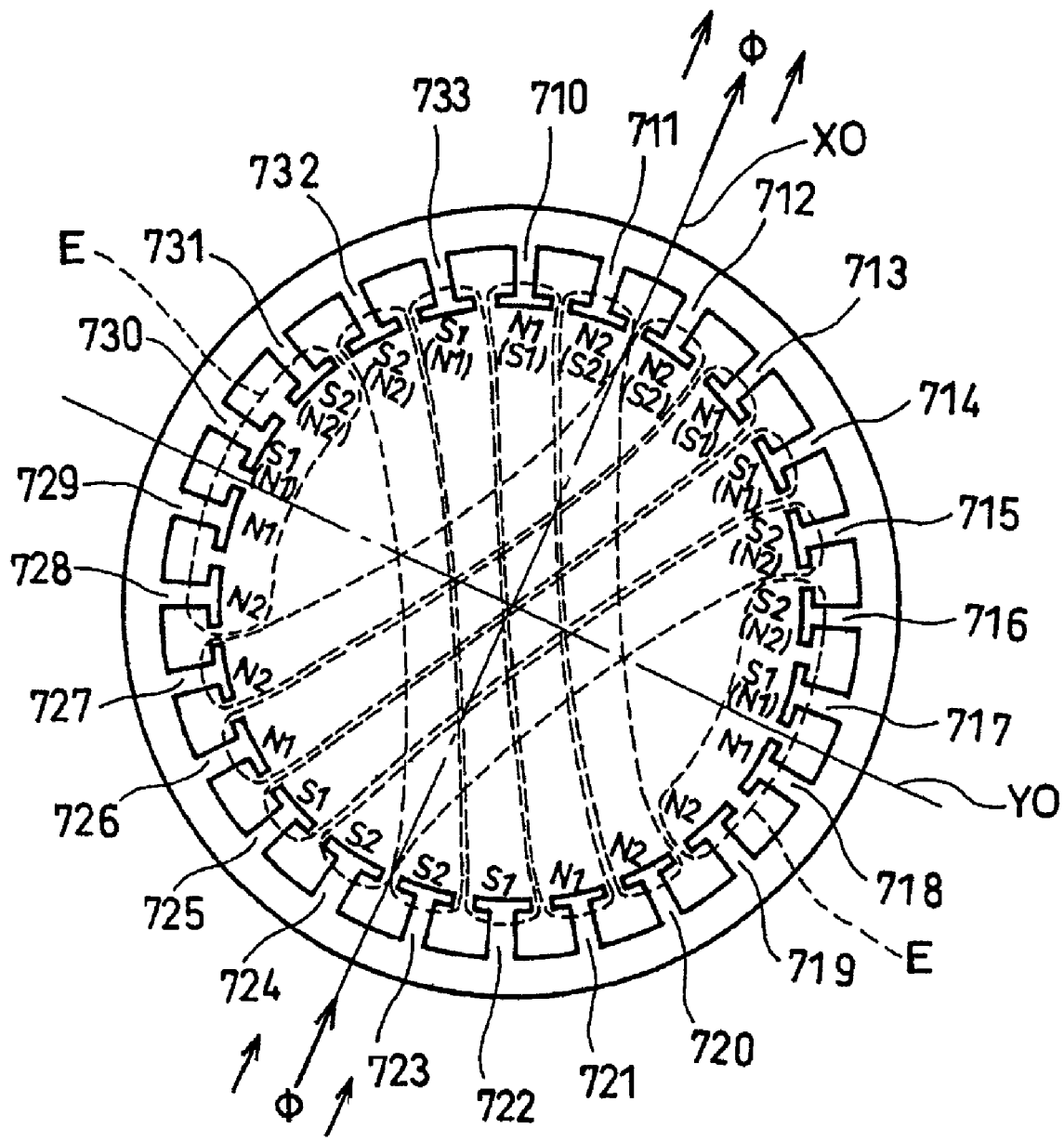
FIG. 7 is a diagram depicting the effect of external magnetic flux on the output coils when the angle at which external magnetic flux is introduced differs from the angle shown in FIG. 6.

However, as shown in FIG. 7, an example in which the external magnetic flux φ is introduced to the stator 5 from in a direction different from the angle shown in FIG. 6 (the horizontal direction between the stator magnetic poles 723, 724) is described. Similar to the previous example, in the output coils wound around the stator magnetic poles 710 through 715, 720 through 727, and 732 through 733, output coils are present which mutually cancel one another due to the stator magnetic poles as indicated by the dotted lines, but for the output coils wound around 716 through 719 and 728 through 731 and identified by the dotted lines E, there are no mutually canceling output coils, and the induced voltages caused by the external magnetic flux φ are respectively added.

As shown in FIG. 5, when the number of output pole pairs Q is 3 (odd), there are cases in which there are no mutually canceling output coils due to the angle at which the external magnetic flux φ is introduced, and induced voltages are not canceled. For the case in which N is 7 and P, Q are 4, 3, Expression 1 is satisfied but Expression 2 is not satisfied, as S=8k. In this case, the variable reluctance resolver cannot be realized, and is beyond the scope of consideration. In the case in which P and Q are respectively 14 and 7, and the number of slots S is 28k, a variable reluctance resolver with an N of 7 can be realized. However the number of slots S is large at 28k, which is not practical when the difficulty and cost of manufacturing are considered. In this case the number of adjacent stator magnetic poles is 2; each has respectively the same polarity, and the output coils on the 2 stator magnetic poles for smoothing the output voltage shown in Expression 10 have the same number of turns.

Figures 8A, 8B, 8C:
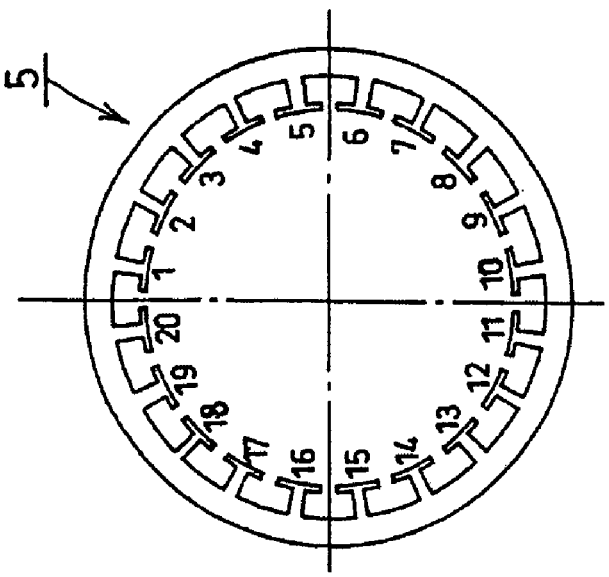
FIG. 8A shows the stator magnetic pole numbers.
FIG. 8B shows the number of excitation coils wound around the stator magnetic poles shown in FIG. 8A.
FIG. 8C shows the number of output coils wound around the stator magnetic poles.

Embodiments of the variable reluctance resolver of the present invention are explained below. For the present embodiment, the stator magnetic pole number and specifications for the excitation coil and the output coil wound thereon are shown in FIG. 8. In the figure, + or − indicates the polarity of the voltage produced by the coil. In the present embodiment, the multiple angle N, number of excitation pole pairs P, number of output pole pairs Q, and number of slots (output magnetic poles) S are respectively 7, 5, 2, and 20. Excitation coils are respectively wound around each stator magnetic pole 39 times so that the polarity of the output voltage on the excitation coil wound around the 2 unit (for example stator magnetic pole numbers 1 and 2) stator group of multiple adjacent stator magnetic poles is the same (−), and the output voltages from the group of excitation coils adjacent to the aforementioned group of excitation coils (stator magnetic pole numbers 3, 4 and 19, 20) have respectively different polarities (+) as shown in FIG. 8(b). The group adjacent to the said multiple stator magnetic pole is not limited to 2 in number; it need only be such that the number of excitation pole pairs P is 5.

In FIG. 8(c), the output coils are wound so that, as shown in FIG. 1, the polarities of the output voltage of the aforementioned output coils wound around a row of 5 stator magnetic poles are the same; taking the output coils for which the aforementioned output voltage polarities are the same as one group, all of the output coils are divided into 4 groups G1, G2, G3, and G4. Output coils in the same group are respectively serially connected so that the aforementioned adjacent group output voltage polarities mutually differ. In FIG. 8(c), G1 consists of stator magnetic pole numbers 1–5, G2 consists of pole numbers 6–10, G3 consists of pole number 11–15, and G4 consists of pole numbers 16–20. Also, the number of turns of the output coils wound around the stator magnetic poles positioned on the side of each of the adjacent aforementioned groups is fewer than the number of turns of the output coils wound around the stator magnetic poles positioned on the inside of the aforementioned stator magnetic poles within the relevant group. For example, as shown in FIG. 8(c) for the stator magnetic pole numbers 1, 2, 3, 4, 5, the number of turns are 72, 189, 234, 189, and 72, respectively.

Figure 9:
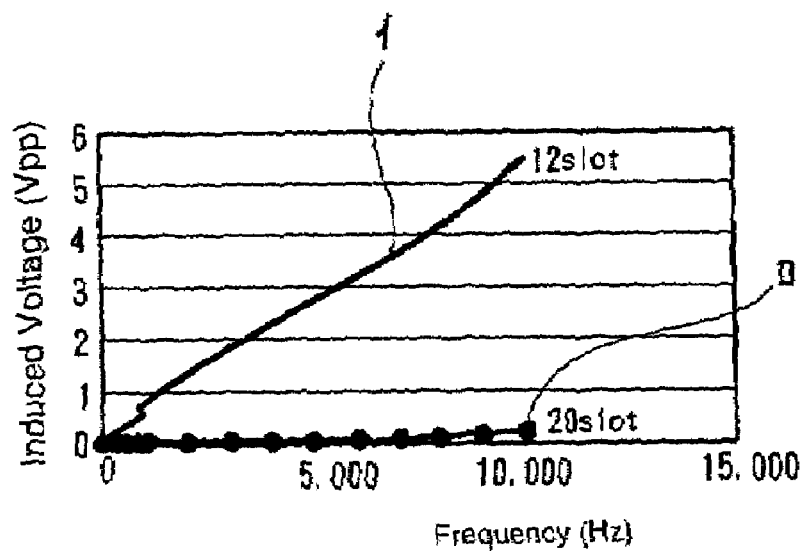
FIG. 9 is a graph comparing the performance of the embodiment shown in FIG. 8 to a conventional variable reluctance resolver.
Figure 10:
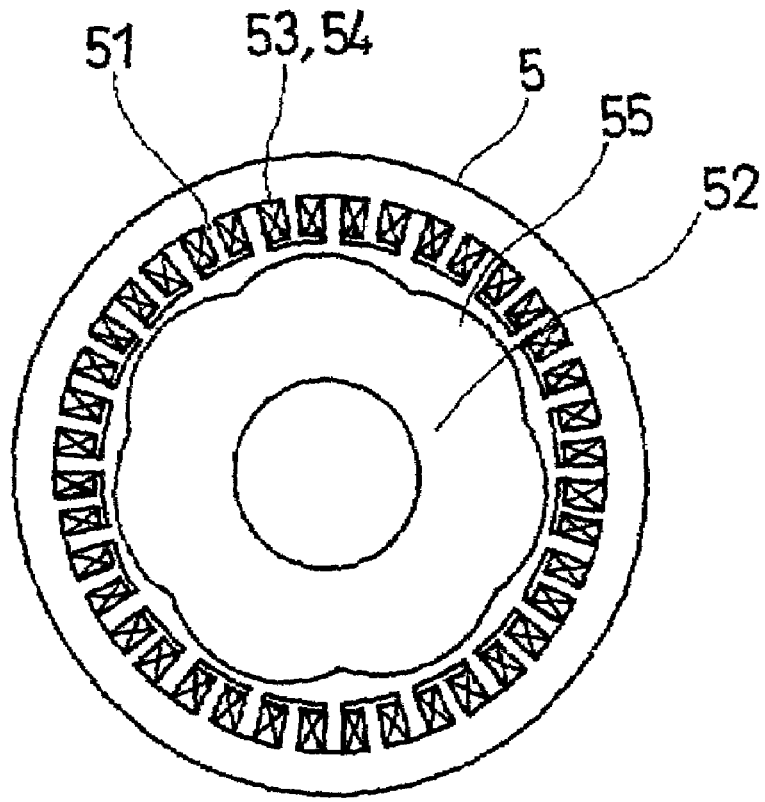
FIG. 10 is a diagram depicting a conventional variable reluctance resolver.
Figure 11:
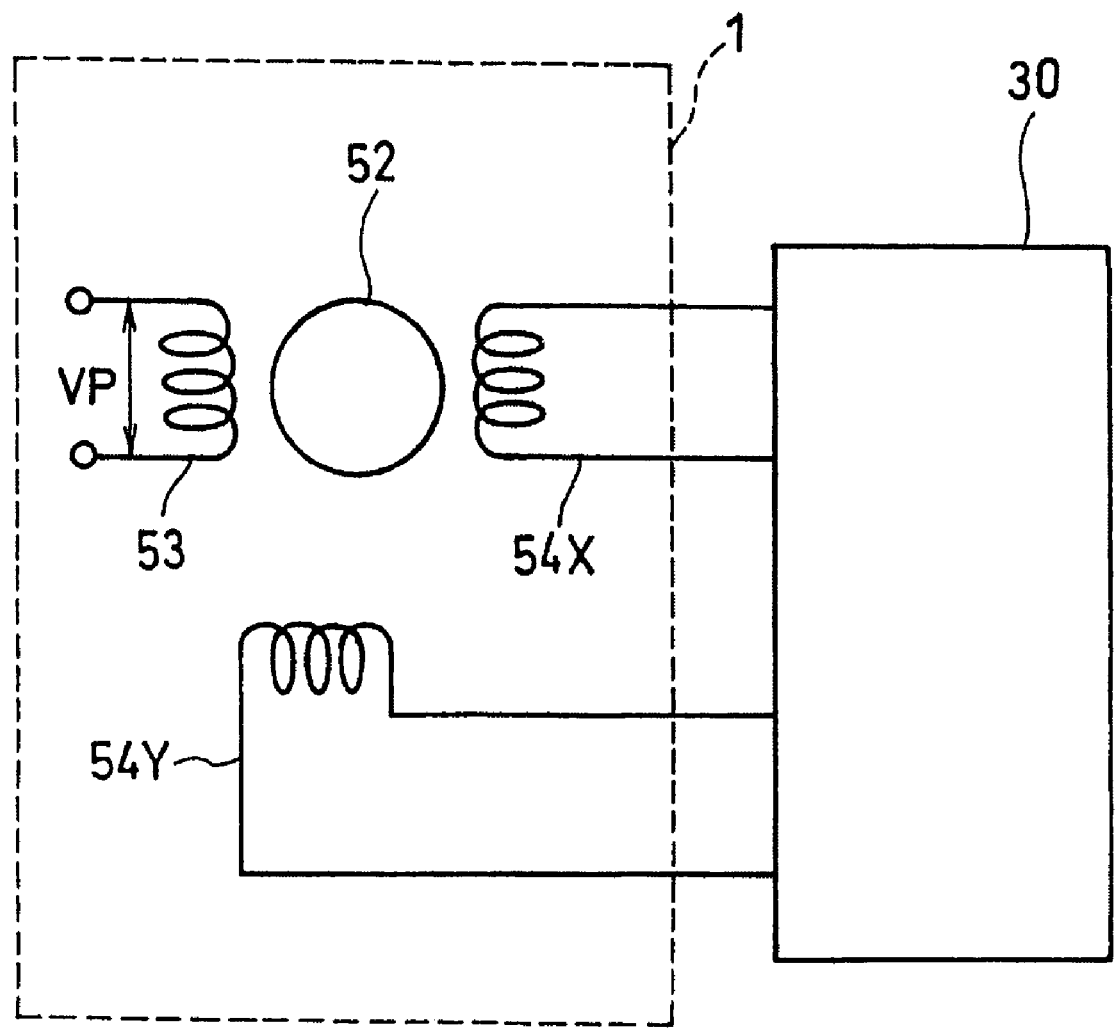
FIG. 11 is a diagram showing the conventional variable reluctance resolver in use.
Figure 12:
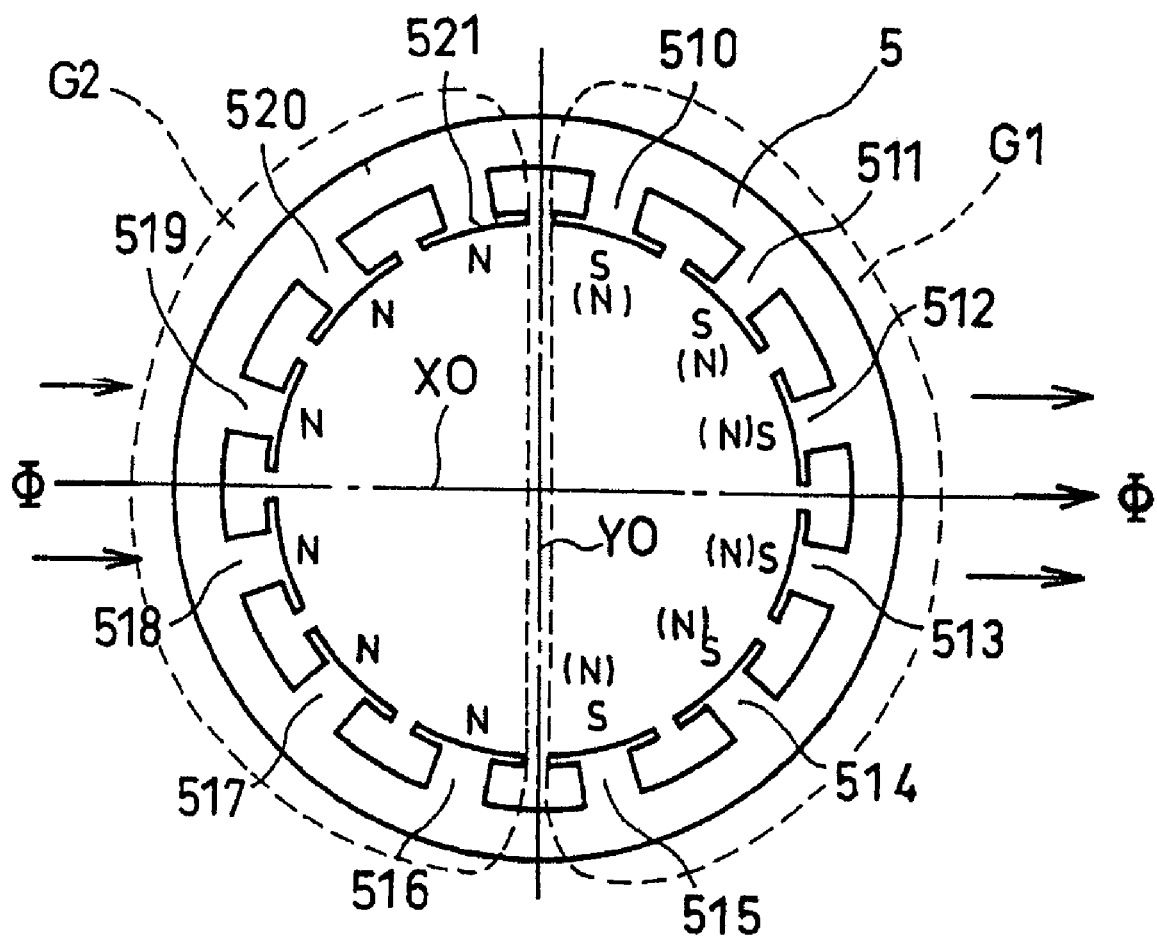
FIG. 12 is a diagram showing the polarities of voltages produced in output coils wound around multiple stator magnetic poles formed on the stator of a conventional variable reluctance resolver.

FIG. 9 shows a comparison of characteristics between the conventional variable reluctance resolver shown in FIG. 12 and the embodiment of the present invention shown in FIG. 8. The induced voltage produced in the output coil by the external magnetic flux along the vertical axis and the change in frequency of the aforementioned external magnetic flux on the horizontal axis are respectively shown by the reference numbers i and ii. As is clear from FIG. 9, the induced voltage caused by external magnetic flux according to the variable reluctance resolver of the present invention is reduced to approximately ⅒th compared to a conventional variable reluctance resolver. A known magnetic shield may be applied to the variable reluctance resolver of the present invention, which of course would result in a further diminution of the effects of external magnetic fields.

According to the variable reluctance resolver of the present invention, output coils wound in such a way that the voltages of output coils wound around a row of 3 or more stator magnetic poles have the same polarity are taken to be a single group. All the output coils are divided into an even number of groups, 2 or more, and output coils are respectively serially connected so that the aforementioned adjacent group output voltage polarities mutually differ. By making the number of turns of the output coils wound around the stator magnetic poles positioned on the side of each adjacent group smaller than the number of turns of the output coils wound around the stator magnetic poles positioned on the inside of the aforementioned stator magnetic poles in the relevant group, the effect of external magnetic flux introduced from outside can be reduced. There is also little effect with respect to the direction of the introduced external magnetic flux. As a result, it becomes acceptable to eliminate the magnetic shield conventionally required, or to use a simple magnetic shield or, by using a shield, to improve performance in comparison with a conventional variable reluctance resolver. It is also possible to achieve a variable reluctance resolver with smooth output voltage change and high precision. Furthermore, the effect of external magnetic flux introduced from outside can be reduced even with a small number of stator magnetic poles, making the variable reluctance resolver easier to manufacture and permitting costs to be reduced.

While particular embodiments of the present invention have been described, it will be apparent to those skilled in the art that changes and modifications may be made without departing from this invention in its broader aspect and, therefore, the appended claims are to encompass within their scope all such changes and modifications that fall within the true sprit and scope of this invention.

What is claimed is:

1. A variable reluctance resolver comprising multiple stator magnetic poles having resolver exciter coils and resolver output coils, which respectively output the X component and Y component of a rotary angle in accordance with the rotation of a rotor, wherein:

the resolver output coils are wound such that the output voltage polarities of the resolver output coils wound around at least 3 adjacent stator magnetic poles are the same;

the resolver output coils are divided into at least 2 or a greater even number of groups;

the resolver output coils within each group of the at least 2 or a greater even number of groups are connected in series such that the output voltage polarities of adjacent groups of the at least 2 or a greater even number of groups differ with respect to one another; and each group of the at least 2 or a greater even number of groups has outermost output coils and output coils between the outermost output coils wherein the number of turns of each of the outermost output coils is less than the number of turns of the output coils between the outermost output coils to reduce the effect of external magnetic flux.

2. The variable reluctance resolver according to claim 1 wherein the outermost coils have the same number of turns.

3. The variable reluctance resolver according to claim 1 wherein the outermost coils of adjacent groups have the same number of turns.

4. The variable reluctance resolver according to claim 1 wherein the variable reluctance resolver has an axis multiple angle of 7, an excitation pole pair count of 5, an output pole pair count of 2, and a stator magnetic pole count of 20, wherein all output coils are divided into 4 groups, one group of the 4 groups includes output coils wound around 5 adjacent stator magnetic poles such that the polarity of output voltages in the group is the same, and the output coils in each of the four groups are serially connected so that the output voltage polarities of adjacent groups are different.

5. The variable reluctance resolver according to claim 4 wherein each group has two outermost output coils and three output coils between the outermost output coils and wherein the number of turns of each of the outermost output coils is less than the number of turns of the three output coils between the outermost output coils to thereby reduce the effect of external magnetic flux.

6. The variable reluctance resolver according to claim 5 wherein the outermost coils of adjacent groups have the same number of turns.

7. The variable reluctance resolver according to claim 5 wherein the two outermost coils have the same number of turns.

8. The variable reluctance resolver according to claim 5 wherein the three output coils between the outermost output coil include a middle coil between two adjacent output coils and wherein the middle coil has more turns than the two adjacent coils.

9. A variable reluctance resolver comprising a rotor, a stator body having a plurality of stator magnetic poles, resolver exciter coils wound around the plurality of stator magnetic poles, and resolver output coils wound around the plurality of stator magnetic poles for outputting the X and Y components of a rotary angle of the rotor, wherein:

the resolver output coils are wound such that the output voltage polarities of the resolver output coils wound around at least 3 adjacent stator magnetic poles are the same;

the resolver output coils are divided into 2 or a greater even number of groups;

the resolver output coils within each group of the at least 2 or a greater even number of groups are connected in series such that the output voltage polarities of adjacent groups of the at least 2 or a greater even number of groups differ with respect to one another; and each group of the at least 2 or a greater even number of groups has outermost output coils and output coils between the outermost output coils wherein the number of turns of each of the outermost output coils is less than the number of turns of the output coils between the outermost output coils to reduce the effect of external magnetic flux.

10. The variable reluctance resolver according to claim 9 further comprising an axis multiple angle of 7, an excitation pole pair count of 5, an output pole pair count of 2, and a stator magnetic pole count of 20, wherein all output coils are divided into 4 groups, one group of the 4 groups includes output coils wound around 5 adjacent stator magnetic poles such that the polarity of output voltages in the group is the same, and the output coils in each of the four groups are serially connected so that the output voltage polarities of adjacent groups are different.

11. The variable reluctance resolver according to claim 10 wherein each group has two outermost output coils and three output coils between the outermost output coils and wherein the number of turns of each of the outermost output coils is less than the number of turns of the three output coils between the outermost output coils to thereby reduce the effect of external magnetic flux.

12. The variable reluctance resolver according to claim 11 wherein the outermost coils of adjacent groups have the same number of turns.

13. The variable reluctance resolver according to claim 11 wherein the two outermost coils have the same number of turns.

14. A variable reluctance resolver comprising a rotor, a stator body having a plurality of stator magnetic poles, resolver exciter coils wound around the plurality of stator magnetic poles, and resolver output coils for outputting the X and Y components of a rotary angle of the rotor wound around the stator magnetic poles and having a multiple angle of 7, an excitation pole pair count of at least 5, an output pole pair count wherein the excitation pole pair count and the output pole pair count add or subtract to equal the multiple angle of 7, and a stator magnetic pole count of 20, wherein all output coils are divided into 4 groups, one group of the 4 groups includes output coils wound around 5 adjacent stator magnetic poles such that the polarity of output voltages in the group is the same, and the output coils in each of the four groups are serially connected so that the output voltage polarities of adjacent groups are different.

* * * * *